Nov. 26, 1968 H. H. WIEDER 3,413,457

ANALOG RATIO COMPUTER USING HALL GENERATOR

Filed Aug. 27, 1963 3 Sheets-Sheet 1

HARRY H. WIEDER
INVENTOR.

BY J. McSt. Amand
ATTORNEY

Nov. 26, 1968 H. H. WIEDER 3,413,457

ANALOG RATIO COMPUTER USING HALL GENERATOR

Filed Aug. 27, 1963

3 Sheets-Sheet 2

HARRY H. WIEDER
INVENTOR.

BY J. M. St. Amand

ATTORNEY

Nov. 26, 1968 H. H. WIEDER 3,413,457

ANALOG RATIO COMPUTER USING HALL GENERATOR

Filed Aug. 27, 1963 3 Sheets-Sheet 3

HARRY H. WIEDER
INVENTOR.

BY J. M. St. Amand
ATTORNEY

3,413,457
ANALOG RATIO COMPUTER USING HALL GENERATOR

Harry H. Wieder, Riverside, Calif., assignor to the United States of America as represented by the Secretary of the Navy Filed Aug. 27, 1963, Ser. No. 305,019
6 Claims. (Cl. 235—196)

The invention herein described may be manufactured and used by or for the Government of the United States of America for governmental purposes without the payment of any royalties thereon or therefor.

This present invention relates to apparatus for obtaining the ratio of two electrical input quantities. The input signals may be either DC or pulse voltages. Apparatus of this invention is also useful as a hyperbolic function generator yielding an output which has a hyperbolic relation to the two variable, electrical, input parameters. The device may also be used for obtaining, with a high degree of precision, an output signal proportional to the reciprocal of an electrical input.

The main disadvantages of present methods of analog division are: the apparatus required is complex, a number of interconnected amplifiers and feedback loops are generally required, the range of dynamic operation is restricted and the level of the output signal is low.

The present invention provides the practical realization of an analog divider capable of either DC, AC or pulsed operation over a wide dynamic range of input signals. The division of two electrical quantities is accomplished with a precision of the order of 1% over a limited range and better than 2% over the entire dynamic range. Embodiments of the present invention using both thin semiconductor film and bulk crystalline Hall generators are described herein.

In the present invention, an indium antimonide film Hall generator is employed in conjunction with an electro-optic transducer in the feedback loop of a differential amplifier. The Hall voltage is compared against another input signal and the amplified difference controls the current through the Hall plate. The Hall current is shown to be proportional to the ratio of the input signal to the magnetizing current which creates the magnetic field across the Hall plate and the assembled apparatus constitutes an analog divider of fair precision and wide dynamic range.

It is an object of the invention to provide improved apparatus for obtaining the ratio of two variable electrical voltages.

Another object is to provide a hyperbolic function generator for use in analog computers.

A further object is to provide an analog divider.

Other objects and many of the attendant advantages of this invention will become readily appreciated as the same becomes better understood by reference to the following detailed description when considered in connection with the accompanying drawings wherein:

FIG. 1 schematically shows a semiconductor plate to illustrate how a Hall potential is developed when a current is applied at right angles to the magnetic field vector.

Figures 1, 2:
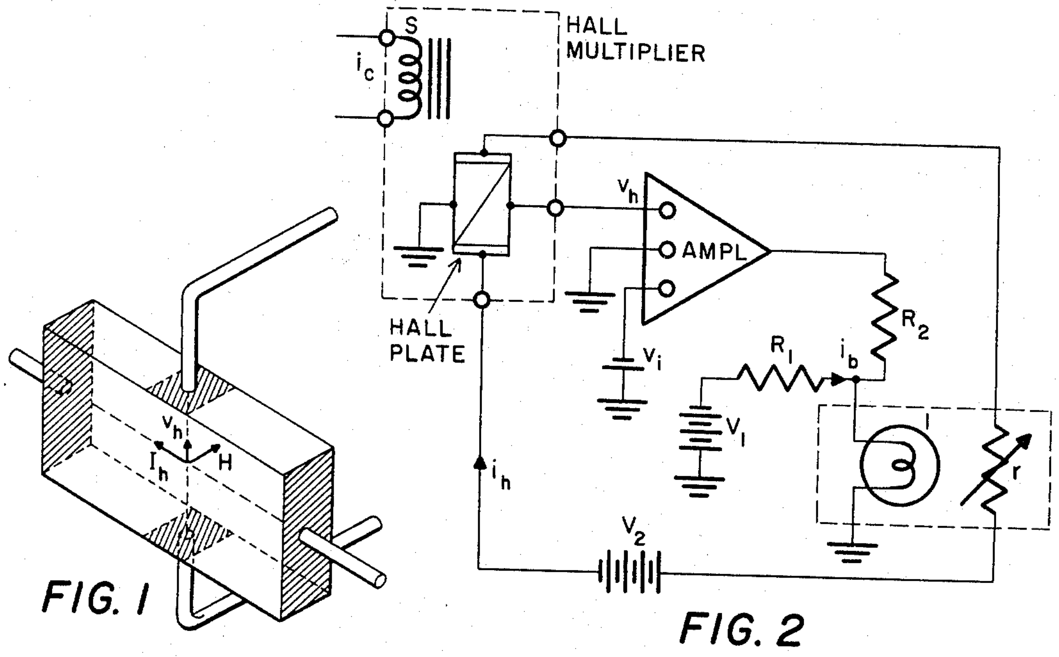
FIG. 2 shows a circuit for performing analog division in which a thin film type Hall generator is used.

A simple and direct method for analog multiplication is based on the large Hall effect encountered in the intermetallic semiconductors such as InSb and InAs. The Hall effect is a physical phenomenon in which a magnetic field affects an electron current wthin a conducting plate, as shown schematically in FIG. 1. The electrons deflected by the field generate across the plate a potential difference defined as the Hall voltage.

The voltage $v_h$ of such a Hall generator is directly proportional to the product of the Hall current $i_h$ and the effective magnetic field H, $$v_h=(R_h/d)i_hH\times10^{-8}\text{v} \qquad (1)$$

The Hall coefficient $R_h$ is a material parameter expressed in cm.$^3$/coulomb, $d$ is the thickness of the Hall plate in cm., $i_h$ the Hall current in amperes, and H=magnetic field in oersteds.

Let the magnetic field be generated by a current $i_c$ in a solenoid enclosed within a ferrite pot core such that $H=ci_c$, the parameter $c$ being a function of the effective permeability and geometry of the magnetic circuit. Provided that the magnetization is below the region of saturation, hysteresis effects are absent, thermal variations either due to ambient conditions or joule heating of the semiconductor plate are negligible, then Eq. 1 may be written as:

$$v_h=ki_ci_h. \qquad (2)$$

Analog multipliers using Hall generators are based on Eq. 2. With $k$=constant, the Hall voltage is directly proportional to the product of the magnetizing current and the Hall current with an accuracy better than 1%.

Hall effect generators may also be used for performing other analog computer functions such as division. Consider, for example, the circuit of FIG. 2. A Hall plate is subjectetd to a magnetic field induced by the magnetizing current $i_c$ in the ferrite core encased inductance $s$. A current $i_h$ then generates the Hall voltage $v_h$ across the Hall plate. The Hall current is measured by means of a low resistance precision galvanometer (not shown in FIG. 2) in series with the drive current circuit of the Hall plate. A differential amplifier is used to produce an output signal proportional to the difference between an arbitrary input signal, $v_i$, and the Hall voltage $v_h$. The amplifier output is applied to the resistance $R_2$ in series with the lamp 1. The light intensity of the lamp controls the magnitude of the photoresistor $r$ which is in series with the voltage source $V_2$ and consequenly controls the Hall current $i_h$. The electro-optic device, shown within the dash-enclosed rectangle of FIG. 2, completes the feedback loop around the amplifier and also isolates the input from the output circuit of the Hall plate. The bias source made up of $V_1$ and $R_1$ is used for setting 1 at a maximum closed loop power gain and a minimum control power requirement.

The circuit of FIG. 2 operates as follows: Let the magnetizing current $i_c=0$ then $v_h=0$ and, therefore, $v_i=\alpha i_{h0}$ where $\alpha$ is a constant parameter and $i_{h0}$ is the initial Hall current. Let a magnetic field be developed by a current $i_c$ applied to the solenoid. A Hall voltage $v_h$ will develop across the Hall plate and the high gain negative feedback loop will be in balance when $$\alpha i_{h0}=ki_hi_c \qquad (3)$$

Consequently, in the quiescent state, the Hall current is proportional to the ratio of the input voltage to the magnetizing current $$i_h = v_i/(k i_c) \quad (4)$$

Suppose, however, that a potential $v_u$ exists between the Hall electrodes in the absence of an applied magnetic field. Such a potential will arise due to the physical misalignment of the Hall electrodes and the consequent unbalance of the equipotential lines within the Hall plate. Let $v_u = \beta i_h$, then $i_h(k i_c - \beta) = v_i$ and, therefore, $$i_h = [v_i/(k i_c)]/[1 - \beta/(k i_c)] \quad (5)$$

A comparison of Eqs. (4) and (5) shows that for precise analog division, $\beta/(k i_c) << 1$. In Eq. 4 the Hall current $i_h$ as function of the magnetizing current $i_c$ may be represented by a family of equilateral hyperbolas with $(v_i/k)$ as a fixed parameter and the coordinate axes $i_c = 0$ and $i_h = 0$ as asymptotes. In Eq. 5, these equilateral hyperbolas are displaced so that the asymptote for $i_h$ is $i_c = k/\beta$.

Figure 3:
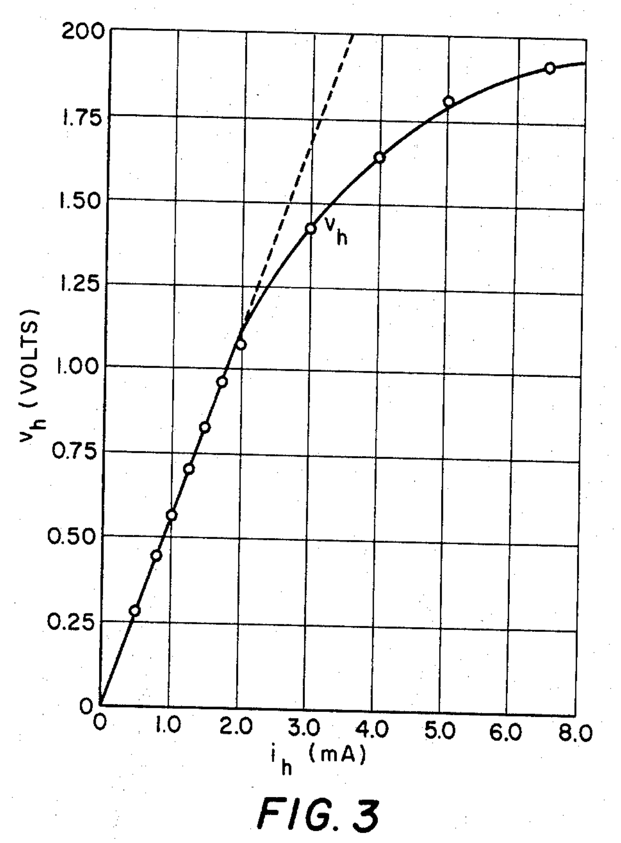
FIG. 3 illustrates Hall voltage as a function of driving current for a thin film Hall plate.

The circuit shown in FIG. 2 was built using a special Hall generator constructed from a thin film of indium antimonide evaporated upon a cover glass and mounted on the center leg of a ferrite cup core in accordance with U.S. Patent applications Ser. No. 150,846 filed Nov. 7, 1961 and Ser. No. 162,616 filed Dec. 27, 1961. A solenoid enclosed within the cup core completes the Hall generator assembly. The main advantage of a thin semiconductor film, as expressed in Eq. 1, is the increased open circuit sensitivity, i.e., the Hall voltage per unit magnetic field is increased as the thickness of a Hall plate decreases. FIG. 3 shows, for the Hall generator, the DC Hall voltage as a function of Hall current for $H = 5 \times 10^3$ Oe. prior to mounting in cup core. It is readily apparent that for currents up to 1.75 ma. a relation linear to 1% is maintained between $v_h$ and $i_h$. Higher currents lead to Joule heating of the Hall plate with an attendant decrease in the Hall coefficient producing the nonlinear portion of the curve in FIG. 3. It is thus desirable to restrict operation of this Hall generator for multiplication or division to currents less than 1.75 ma.

Figure 4:
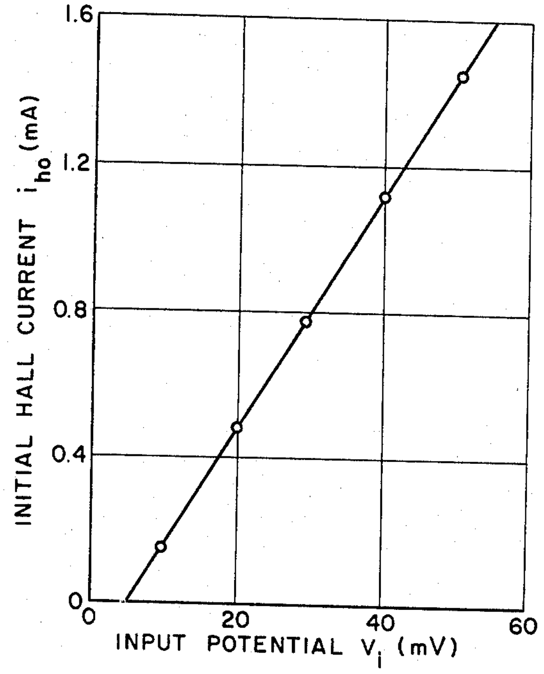
FIG. 4 illustrates initial Hall current at zero magnetization current as a function of input signal $v_i$ in the circuit of FIG. 2.

For example a differential operational amplifier, such as Philbrick type P–2, adjusted for an open loop voltage gain of 100 and followed by a model 6035 current booster amplifier of the same manufacture, performs the function of the amplifier in FIG. 2. An electro-optic device, such as Raytheon type CK 1114 Raysistor was used in conjunction with a load resistance $R_2 = 500\Omega$. Since the highest resistance of the lamp 1 is 50Ω, the output current of the amplifier effectively controls the light intensity output of the lamp and hence the value of *r*. A 22.5-v. battery in series with *r* supplies the Hall current in the feedback loop of the Hall multiplier. With $i_c = 0$ and the biasing current set for 17.5 ma., the dependence of the initial Hall current $i_{h0}$ upon the input signal $v_i$ was determined and is shown in FIG. 4 to conform to $v_i + 5 = 0.032 i_{h0}$. Consequently, the unbalance potential at the input ports of the differential amplifier is 5 mv. and may be due primarily to the misalignment potential of the Hall generator.

Figure 5:
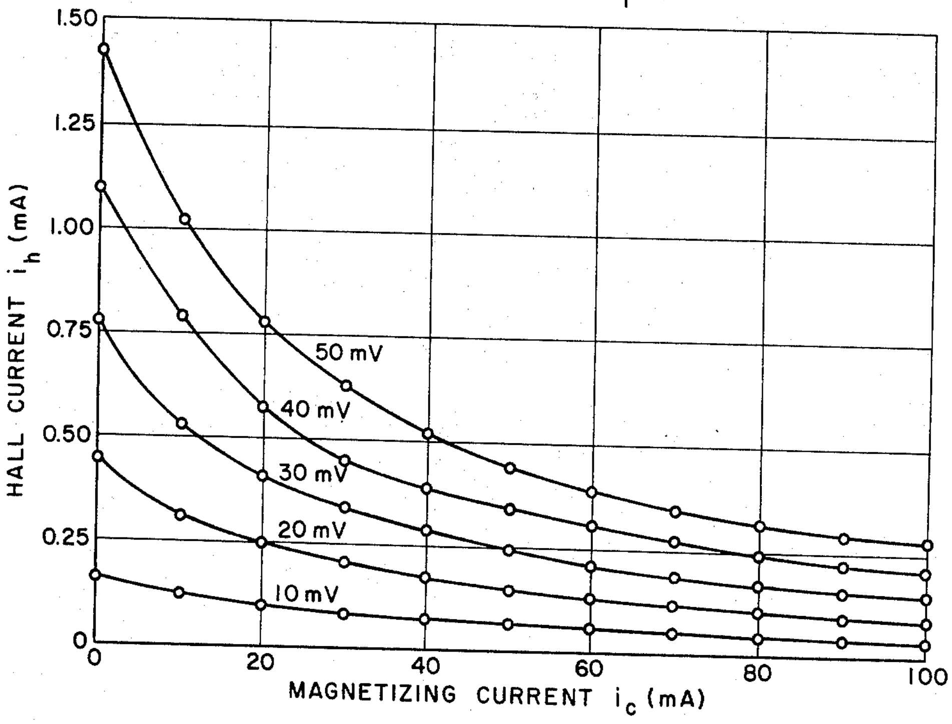
FIG. 5 illustrates Hall current vs. magnetizing current showing hyperbolic relation between $i_h$ and $i_c$.

FIG. 5 shows that $i_h$ as a function of $i_c$ is indeed represented by a family of equilateral hyperbolas displaced with respect to the origin in accordance with Eq. 5. The mean value of *k* determined from FIG. 5 is $$k = (0.603 \pm 0.014)$$

v./ma.$^2$ for all the hyperbolas and it is constant to within 1.6% for a fixed value of $v_i$. The latter value is well within the limits of precision of the instruments used to measure $i_c$, $i_h$, and $v_i$. The total imbalance at the input of the amplifier was found to be 5.2 mv. and is independent of the magnitudes of $i_c$ or $v_i$.

All the data presented herewith illustrate the application of the instrument for the generation of an analog hyperbolic relationship between two input voltages or an input voltage and an input current. In order to use the apparatus for analog division, the imbalance potential at the input ports of the differential amplifier was reduced to 0.1 mv. by decreasing the misalignment potential of the Hall generator. It was then found experimentally that for $i_c \geq 24$ ma., the Hall current $i_h$ is proportional to the ratio of $v_i$ to $i_c$ to within 2% and the precision of the division increases with $i_c$ in accordance with Eq. 5. A range of 4:1 is available between $24 \leq i_c \leq 96$ ma. for the circuit. Above $i_c = 96$ ma., magnetic saturation effects in the ferrite core decrease the precision of the measurement. A range greater than 10:1 was found to be available for $v_i$. Careful design and better ferrite cores should allow an increase in the dynamic range of $i_c$. The range of $v_i$ is evidently limited by the peak permissible $i_{h0}$ and the performance capability of the amplifier. An improvement in the galvanomagnetic properties of the InSb films presently under development should lead to a higher sensitivity of such Hall generators and consequently an increase in the dynamic region in which precise analog division may be performed with the circuit of FIG. 2.

By replacing $V_2$ with a pulse source, a number of significant advantages in the operation of the divider are obtained:

(a) The peak current may be increased without exceeding the steady-state heat dissipation of the Hall plate, hence, in accordance with Eq. 1, a higher Hall voltage per unit magnetic field may be obtained from the Hall generator and the operational range of the divider is thus extended.

(b) Pulsed operation while decreasing the stand-by power consumption of the circuit also permits an increased current to flow through the photoresistor *r*. Since the manufacturers' specification state a 50-mw. limit on the power dissipated by this resistor, higher peak pulse currents may be passed through it without exceeding this limit.

(c) By pulse driving the Hall plate, the primary of the pulse transformer may be grounded and deleterious ground loop circuits may be avoided. If both $v_i$ and $V_2$ are pulsed, a means of synchronization is required in order to obtain analog division by the method described here.

The following alternatives have been examined in the use of a Hall generator for analog division:

(a) The Raysistor CK 1114 was replaced by a lamp and silicon photodiode. This improved the stability of the circuit and increased the closed loop gain.

(b) The filamentary lamp of the Raysistor was replaced by a neon tube. This precluded the use of the transistor differential amplifier and required the use of a vacuum-tube amplifier with an output of the order of 120 v. peak so as to exceed the breakdown voltage of the neon tube. The main advantage of ionized gas type of Raysistors is an increase in frequency response over that of the filamentary types and an indefinite lifetime compared to the finite life of a filamentary lamp.

(c) The replacement of the P–2 differential amplifier by a magnetic amplifier of similar capabilities should increase the long term reliability of the analog divider.

(d) The Hall current may be obtained from a current source rather than the voltage source shown in FIG. 2. The circuit duals apply in this case, of course, and the Raysistor should be connected in shunt with the current electrodes of the Hall plate. The bias $i_b$ should be reset, but in other respects the performance of the circuit is analogous to the results described above.

(e) If the electro-optic transducer is replaced by a high impedance transformer and $V_2$ by a 1-kc. source, the circuit of FIG. 2 will conform to Eq. 5. However, the loading upon the Hall plate was found to be quite large and the precision of the analog divider was reduced to the order of 10%. It is quite likely, however, that by careful design the amplifier and transformer may be adjusted for a tolerable error in division.

(f) The electro-optic device has some inherent problems because of a short as well as a long term hysteresis and drift, probably connected with the thermal emission from the glass envelope around the filament of the Raysistor. Another device having a comparable sensitivity, but a better long term stability, would materially improve the performance of the divider.

Figure 6:
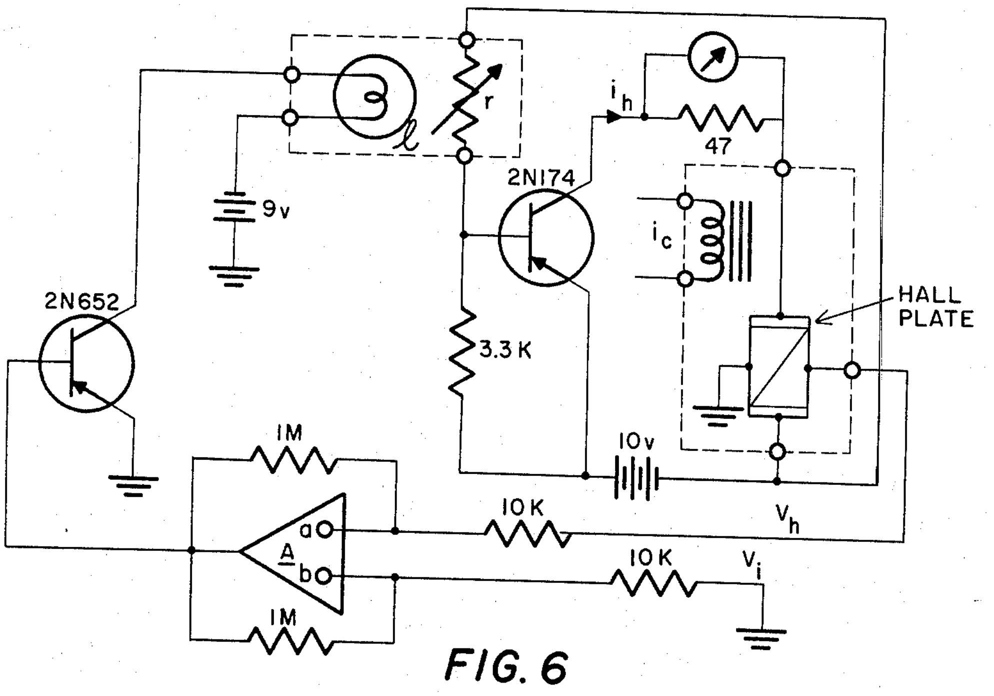
FIG. 6 is another embodiment of the invention showing a circuit of a ratio computer using commercially available bulk crystalline Hall plate.

An analog ratio computer employing a bulk crystalline Hall generator is shown in FIG. 6: As discussed above, analog multipliers based on the Hall effect depend upon the electromagnetic interaction between a longitudinal current $i_h$ in a semiconductor plate (FIG. 1) and an effective orthogonal magnetic field H.

A transverse Hall potential $v_h$ is generated in the plate which is placed in gap of an electromagnet core whose field strength is controlled by the magnetizing current $i_c$. The Hall voltage is directly proportional to the product of $i_c$ and $i_h$, as expressed in Eq. 2. The coefficient $k$ is dependent upon the permeability and geometry of the electromagnet, on the density of charge carriers and upon their mobility within the semiconductor. Provided that $k$ is maintained constant, the product of $i_c$ and $i_h$ can be obtained from such a multiplier with an accuracy of better than 1% over a wide dynamic range.

The control current sensitivity ($\delta v_h/\delta i_c$) for $i_h$=constant is larger for an InSb film Hall plate than for a bulk crystalline Hall generator of the same shape provided that the combined thickness of film and substrate is less than that of the massive material. The smaller gap width decreases the reluctance of the magnetic circuit and increases the MMF for a given $i_c$.

The Hall current sensitivity ($\delta v_h/\delta i_h$) for $i_c$=constant, is a reciprocal function of the plate thickness and films have an advantage in this respect over mechanical and chemical methods of reducing the thickness of bulk crystals.

The maximum current that may be applied to Hall generators without introducing thermal perturbations and nonlinear effects is of the order of 2–10 ma. for indium antimonide films one to a few microns in thickness. The peak $i_h$ for bulk crystalline indium arsenide devices is of the order of 150 to 200 ma. In the same context, the boundary of the dynamic region for $i_c$ is the onset of a non-linear relationship between $i_c$ and the magnetic induction in the gap of the ferromagnetic core.

In many respects the technology of vacuum deposition of films for Hall effect applications is still in the development stage. On the other hand, bulk crystalline devices are available commercially from a variety of sources. The materials employed for the fabrication of such conventional Hall generators range from metallic bismuth and elemental semiconductors through binary or ternary intermetallic semiconducting compounds. The choice of a particular material is dictated by the required sensitivity of the Hall plate balanced against the contemplated operating temperature range and the permissible nonlinearity introduced by magnetoresistance effects. The considerations outlined here were employed in the design and construction of a multiplier built around a conventional indium arsenide Hall generator mounted in the gap between the center posts of a ferrite core. The current through a thousand turn solenoid within the core provides the MMF. With both $i_c$ and $i_h$ fed from separate DC current sources stabilized to 0.1%, the linearity of the multiplier was found to be of the order of 1% for $i_h \leq 100$ ma. and $i_c \leq 35$ ma. This multiplier was used subsequently for the construction of a ratio computer.

A Hall generator used as a multiplier may be employed to perform a variety of additional analog computing functions. A ratio computer based on the Hall effect in vacuum deposited, micron thick films of indium antimonide was described above. The large $v_h$ of film devices is an advantage in reducing design complexity and the relatively high input and output impedances of such Hall generators provide a good match to auxiliary circuitry. However, films have a higher intrinsic noise level across their Hall electrodes than similar bulk crystalline devices especially at low $i_h$ and $i_c$ driving levels.

The construction of a ratio computer employing a commercially available indium arsenide Hall plate is shown in FIG. 6. The larger dash-enclosed rectangle contains the multiplier. Its Hall voltage output is applied to input terminal $a$ of the differential amplifier A, whose other terminal $b$, is connected to an arbitrary input voltage $v_i$. The amplified difference ($v_i - v_h$) is applied to the grounded emitter power amplifier, 2N652, for example, and controls the light intensity emitted by the lamp $l$. The effective value of the photoresistor $r$ is a function of the light incident upon it. The smaller dash-enclosed rectangle thus constitutes an electro-optic transducer. The photoresistor incorporated into the grounded emitter power amplifier stage, 2N174 for example, determines the amplitude of the drive current $i_h$ applied to the Hall generator. The purpose of the electro-optic transducer and of the circuitry associated with it, is to provide a feedback loop around the differential amplifier and to maintain a high degree of isolation between the input and output circuits of the Hall multiplier.

Let a current $i_c$ be applied to the solenoid of the multiplier and let a potential $v_i$ be applied to input $b$ of the differential amplifier A. The output signal drives the base of the transistor, 2N652 for example, into conduction causing a current to flow through lamp $l$. The light output of the latter brings about a decrease in $r$ thus decreasing the bias on the power transistors, 2N174 for example. A current $i_h$ now flows into the Hall plate and a potential $v_h$ is generated across the Hall plate. The process continues until the feedback loop is in balance and $v_h = v_i$.

Provided the misalignment potential of the Hall plate is negligible and the differential amplifier A is balanced, the Hall current will then be proportional to the ratio of $v_i$ to $i_c$, as expressed in Eq. 4. Equation 4 is that of an equilateral hyperbola with asymptotes at $i_c=0$ and $i_h=0$. In practice, a misalignment potential in the Hall plate, a residual magnetization in the core of a finite unbalance in the differential amplifier may cause a signal to appear at the input for $i_c=0$. This shifts the asymptote of $i_c$ to the left or to the right of the coordinate axes and, therefore, to values of $i_h$ which are finite at $i_c=0$. It also reduces the accuracy of the divider.

Figure 7:
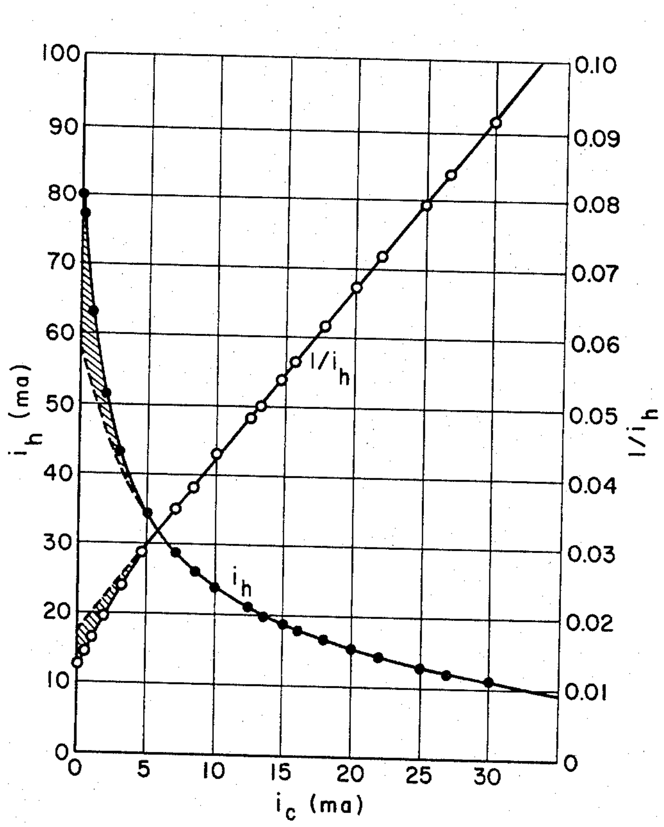
FIG. 7 illustrates the behavior and performance of the circuit of FIG. 6.

The behavior and performance of the assembled ratio computer exclusive of power supply is illustrated in FIG. 7, which shows that for $v_i$ fixed at 50 mv., the reciprocal Hall current is proportional to $i_c$ in accordance with Equation 4. The proportionality is maintained to within 2% for 5 ma.$\leq i_c \leq$35 ma. The shaded part of the curve is the region in which the misalignment potential of the Hall plate, the differential amplifier unbalance and hysteresis of the electro-optic transducer render the operation of the device marginal. Results similar to those shown in FIG. 7 were obtained for 1 mv.$\leq v_i \leq$100 mv. The dynamic range of $v_i$ is evidently limited by the peak permissible $i_h$ and the linear operational region of the differential amplifier.

The stability of the ratio computer of FIG. 6 appears to be primarily a function of the drift in the differential amplifier and of the electro-optic transducer. Conceivably, improvements in both of these devices, as well as the introduction of a circuital method for automatic balance of the misalignment potential between the Hall electrodes, would improve the performance of the ratio computer by a considerable margin. The simplicity, large dynamic range of operation and fair precision are the primary advantages of this ratio computer.

Obviously many modifications and variations of the present invention are possible in the light of the above teachings. It is therefore to be understood that within the scope of the appended claims the invention may be practiced otherwise than as specifically described.

What is claimed is:

1. A circuit for performing analog division comprising:

(a) a Hall plate, (b) a first voltage source for applying a Hall current to said Hall plate, (c) controlled means for subjecting said Hall plate to a magnetic field whereby a Hall current applied to said plate at right angles to said magnetic field will generate a Hall voltage across said Hall plate, said Hall voltage being directly proportional to the product of the Hall current and the effective magnetic field, (d) a differential amplifier having an arbitrary input signal fed thereto, (e) said Hall voltage also being fed to said differential amplifier which produces an output signal proportional to the difference between said Hall voltage and said arbitrary input signal, (f) an electro-optic transducer, consisting of a lamp and a photoresistor, used as a feedback element, (g) a resistance, to which the output of said differential amplifier is fed, in series with said lamp, (h) a bias voltage source connected to the junction of said resistance and lamp for setting said lamp at a maximum closed loop power gain and a minimum control power requirement, (i) the light intensity of said lamp controlling the magnitude of said photoresistor, (j) said photoresistor being connected in series with said first voltage source and consequently controlling said Hall current, (k) said electro-optic transducer completing a feedback loop around said differential amplifier and also isolating the Hall current input from the output circuit of the Hall plate.

2. A circuit as in claim 1 wherein said Hall plate is a thin film intermetallic semiconductor.

3. A circuit as in claim 1 wherein said Hall plate is a thin film semiconductor cut to desired shape and mounted on a center post within a ferrite cup core and said magnetic field means consisting of a solenoid about said center post within said ferrite cup core.

4. A circuit for performing analog division comprising:

(a) a Hall plate, (b) means for applying a Hall current to said Hall plate, (c) controlled means for subjecting said Hall plate to a magnetic field whereby a Hall current applied to said plate at right angles to said magnetic field will generate a Hall voltage across said Hall plate, said Hall voltage being directly proportional to the product of the Hall current and the effective magnetic field, (d) a differential amplifier having an arbitrary input signal fed thereto, (e) said Hall voltage also being fed to said differential amplifier which produces an output signal proportional to the difference between said Hall voltage and said arbitrary input signal, (f) an electro-optic transducer, consisting of a lamp and a photoresistor, used as a feedback element, (g) a resistance, to which the output of said differential amplifier is fed, in series with said lamp, (h) a bias voltage source connected to the junction of said resistance and lamp for setting said lamp at a maximum closed loop power gain and a minimum control power requirement, (i) the light intensity of said lamp controlling the magnitude of said photoresistor, (j) said photoresistor being connected to said Hall current means for controlling the Hall current, (k) said electro-optic transducer completing a feedback loop around said differential amplifier and also isolating the Hall current input fom the output circuit of the Hall plate.

5. A circuit for performing analog division comprising:

(a) a Hall plate, (b) means for applying a Hall current to said Hall plate, (c) controlled means for subjecting said Hall plate to a magnetic field whereby a Hall current applied to said plate at right angles to said magnetic field will generate a Hall voltage across said Hall plate, said Hall voltage being directly proportional to the product of the Hall current and the effective magnetic field, (d) a differential amplifier having an arbitrary input signal fed thereto, (e) said Hall voltage also being fed to said differential amplifier which produces an output signal proportional to the difference between said Hall voltage and said arbitrary input signal, (f) an electro-optic transducer, consisting of a lamp and a photoresistor, used as a feedback element, (g) means, to which the output of said differential amplifier is fed, connected in series with said lamp, for controlling the light intensity emitted by said lamp, (h) the light intensity of said lamp controlling the magnitude of said photoresistor, (i) said photoresistor being connected to said Hall current means for controlling the Hall current, (j) said electro-optic transducer completing a feedback loop around said differential amplifier and also isolating the Hall current input from the output circuit of the Hall plate.

6. A circuit for performing analog division comprising:

(a) a Hall plate, (b) a means for applying a Hall current to said Hall plate, (c) controlled means, electrically isolated from said Hall plate, for subjecting said Hall plate to a magnetic field whereby a Hall current input applied to said plate at right angles to said magnetic field will generate a Hall voltage across said Hall plate output, said Hall voltage being directly proportional to the product of the Hall current and the effective magnetic field, (d) a differential amplifier having an arbitrary input signal fed thereto, (e) said Hall voltage also being fed to said differential amplifier which produces an output signal proportional to the difference between said Hall voltage and said arbitrary input signal, (f) a transducer means which is controlled by the output of said differential amplifier having the output of said differential amplifier fed to a first portion thereof and having the other portion thereof connected to said Hall current means for controlling the Hall current applied to the Hall plate, said first portion of the transducer means completing the feedback loop around the Hall plate output circuit, and both portions of said transducer means providing isolation between the Hall current input and the Hall output circuit.

References Cited

UNITED STATES PATENTS 3,121,788 2/1964 Hilbinger ---------- 235—194

3,215,824 11/1965 Alexander et al. 235—194 X

MALCOLM A. MORRISON, *Primary Examiner.*

J. F. RUGGIERO, *Assistant Examiner.*